3,051,571
PROCESS OF MAKING A STOCK FEED ADDITIVE
Marcus N. Pergament, 79 Versailles Blvd., New Orleans, La.
No Drawing. Filed Feb. 10, 1959, Ser. No. 792,272
4 Claims. (Cl. 99—2)

This invention relates to a stock feed additive and process of making the same.

In recent years, animal and vegetable fats have been added to regular poultry and other stock feeds to foster rapid growth. Regular poultry feeds are made up of various combinations of grains with some additives, such as crushed oyster shells for calcium content and other additives for vitamin content. Intensive research work has uncovered the fact that the addition of animal or vegetable fat in amounts as high as 10% causes the poultry to put on weight in a shorter period of time, thus reducing the breeder's cost per pound of fowl.

Animal or vegetable fat is added to such mixes by melting the fat and either spraying it into the mix, or pouring it into such mix, under constant agitation. The agitation, of course, is intended to produce a homogeneous mixture, but usually does not. Since 90–95% of the contents of the mix is dry grain or grains, it is very difficult, and, in fact, almost impossible, to obtain a homogeneous mixture therewith of the 5–10% liquid fat. Moreover, the use of the fat thus added to the mix involves practical difficulties. For example, the fat under average temperatures is solid, thus requiring the time and expense necessary to melt the fat and thus place it in such condition that it may be sprayed or poured into the mix. The gummy nature of the resultant feed also makes it difficult to store, handle and pour.

An important object of the present invention is to provide a stock feed additive, such as a dry powdery substance having a fat content almost as high as the actual fat content of the feed material now being used, when the glycerin and moisture, impurities and unsaponifiable matters are taken into consideration, and which, because of its dry powdery nature, can be readily handled, stored over long periods of time and easily mixed with the stock feed to provide a homogeneous mixture.

A further object is to provide such a feed additive which contains a minimum of approximately 80% fat, as compared with the approximate 92–95% actual fat content of animal or vegeteble fat when the glycerin and moisture, impurities and unsaponifiable matters are taken into consideration, and wherein the product contains a substantial percentage of calcium, thus making it unnecessary to use in poultry feed crushed oyster shells or other source of calcium.

A further object is to provide a novel process of making the feed additive referred to, wherein the steps of the process may be relatively economically carried out to provide the dry product referred to having a fat content of high percentage.

A further object is to provide such a process wherein agitation in a certain step or steps may be carried out through brief periods of time, the remaining portion of such step or steps being permitted to take place through the normal exothermic reactions occurring in the process.

The raw materials which are utilized in practicing the teachings of the present inventon comprise A. Acidulated soapstock of animal and vegetable fats, such as tallow, lard, grease, tallow oil, lard oil, grease oil, cottonseed oil, soybean oil, corn oil, peanut oil, cocoanut oil, as well as other fats which are saponifiable; the same being also known as hydrolyzed animal oil or hydrolyzed vegetable oil.

B. Fatty acids of animal and vegetable fats, such as tallow, lard, grease, tallow oil, lard oil, grease oil, cottonseed oil, soybean oil, corn oil, peanut oil, cocoanut oil, etc.

C. Quicklime, i.e., unslaked lime.

D. Water.

According to an illustrative embodiment, these raw materials may be used in the following proportions:

| | |
|---|---|
| Acidulated soapstock (A) or fatty acids (B) or any combination thereof | 378 lbs. or 77.777% |
| Quicklime (C) | 50 lbs. or 10.288% |
| Water (D) | 58 lbs. or 11.933% |
| Total | 486 lbs. or 99.999% |

It will be understood that the aforementioned proportions or ratios may be varied to a limited extent, say 10% or so, with respect to any one ingredient, while still obtaining the benefits of the teachings of the present invention.

Procedure (1) An initial charge of 378 pounds of acidulated soapstock and/or fatty acids is pumped into a tank or kettle, provided with an agitator.

(2) Seven gallons (or about 58 pounds) of water are then added to the charge in the kettle.

(3) The mass is brought up to a temperature of about 190° F. while under constant agitation.

(4) After sufficient agitation to insure fairly thorough mixing of the water with the initial charge, and while heated to about 190° F. as aforesaid, 50 pounds of quicklime is added.

(5) Agitation is continued, and the temperature raised to about 230° F. while saponification begins to take place. The mass rises in the kettle, whereupon the rate of agitation is increased, and the mass settles to its original level. At this point, the rate of agitation is decreased and the mass again rises, whereupon the rate of agitation is increased until the mass again settles to its original level. With decreased agitation, the mass rises a third time (each rise being accompanied by the formation of clouds of steam); and a third time agitation is increased until the mass falls for the third and final time.

(6) The third, and final, agitation is continued for around four or five minutes at increased speed.

(7) The entire batch is then quickly removed from the kettle and permitted to flow onto a concrete floor or into shallow large-area pans or the like.

(8) The reaction between the quicklime, water, and saponifiable material continues to take place after removal from the kettle, being evidenced by small steam bubbles coming to the surface.

(9) After cooling and drying, the mass is broken up, transported to the breaker or "hog," thence to the grinder or mill for final grinding.

The quicklime or calcium oxide combines with water to produce calcium hydroxide

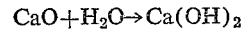

$$CaO + H_2O \rightarrow Ca(OH)_2$$

The calcium hydroxide, in turn, reacts with the acidulated soapstock or the fatty acid

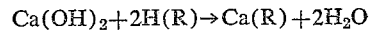

$$Ca(OH)_2 + 2H(R) \rightarrow Ca(R) + 2H_2O$$

The expression H(R) represents the molecule of acidulated soapstock or fatty acid, with the H indicating the hydrogen ion and the R representing the highly complex structure of the animal or vegetable fat radical.

The resultant powdered and marketable end material of the process contains a minimum of 80% fat, as compared with the approximate 92–95% of actual fat content of animal and vegetable fat (which, as previously mentioned, is now being used as an additive in stock feeds) when the glycerin and moisture, impurities and unsaponifiable materials are taken into consideration. The acidulated soapstock, when this material is used, may be purchased in the open market on the basis of approximately 95% acidity. The fat content of the material produced by the present process, therefore, is not materially lower than the unwieldy and troublesome commercial material which is now being employed as an additive for stock feeds.

As previously stated, animal and vegetable fats have been added to stock feeds during the past few years, and the use of such additives in amounts as high as 10% mixed with poultry feed causes the poultry to put on weight in a shorter period of time, thus materially reducing the breeder's cost per pound of fat. Such fat is added by melting it and either spraying it into a mix of grain, etc., under constant agitation, or pouring it into such mix. Agitation of the mix is intended to produce a homogeneous mixture, but since 90–95% of the contents of the mixture are dry grain or grains, it is practically impossible to obtain a homogeneous mixture therewith of the 5–10% liquid fat being agitated in the mixture. The resultant feed, therefore, is not homogeneous mixture, but has present throughout lumps containing higher concentrations of fats than in the remaining body of the feed.

The material obtained from the present process is highly advantageous since, being a dry powdery substance, completely homogeneous feed mixtures may be obtained by adding the material to the grain or grains, and agitation need be carried out for a much shorter length of time.

Additionally, it will be noted that fats now commonly mixed with stock feeds are oily in nature and set and harden in the drums in which they are shipped. They are disadvantageous to use, therefore, for the additional reason that they must be heated to melt them, and thus must be pumped to spray them into the mix, thereby requiring spraying equipment which adds to the expense of the resultant feed mixture and adds a substantial element of time to the completion of the ultimate mix. In contrast to such procedures, the present material, being a dry powdery substance, can be shipped in bags and stored for indefinite periods, and readily may be mixed with the grain or grains of the original stock feed without the use of spraying apparatus, and with the accomplishment, with limited agitation, of a completely homogeneous mix.

The product produced by the present process is highly economical to produce, and while it contains a somewhat lower percentage of fats, more of the present material may be used to bring the ultimate fat content of the feed mixture up to a desired 10%, while still producing a resultant feed mixture at lower cost than is possible by the present use of oily or gummy vegetable fats.

Taking into consideration the economy of the present process, therefore, together with the facility with which the material may be stored and used, there results a substantial saving to stock breeders in the production of the ultimate mix containing the desired fat content.

Referring again to permissible variations in the proportions of the ingredients employed, any departures of 5% or so with respect to all of the ingredients set forth hereinbefore might not deleteriously affect the desired results. As before stated, even a variation of 10% or so of any one ingredient would not greatly affect the final product.

If the fatty acids and/or acidulated soapstock are kept constant and the lime increased by 10%, no appreciable difference would be noted. If, however, the fatty acids and/or acidulated soapstock were increased by 10% and the lime were decreased by 10%, then a very sticky substance would be formed and would present difficulties in ultimate grinding. An increase or decrease of 10% in the water content would not appreciably affect the progress, but would, of course, affect the final percentages under which the product would be marketed.

In the event it is desired to consistently obtain a product having a minimum of 80% fat, the proportions given hereinbefore should be followed within the ranges stated.

The fatty acids or acidulated soapstocks of the various animal and vegetable fats described hereinbefore are made up of such complex saturated and unsaturated materials that it would be virtually impossible to separate them into categories of either saturated or unsaturated compounds. Of the three fatty acids set forth, stearic acid is the only saturated acid, while palmitic acid is unsaturated; and oleic acid is unsaturated to a greater degree.

While I have shown and described certain specific embodiments of the present invention, it will be readily understood that I do not wish to be limited exactly thereto, since various modifications may be made without departing from the scope of the invention as defined in the appended claims.

I claim:

1. The process of making an additive for ready mechanical admixture with stock feeds which includes mixing between approximately 10% and approximately 12% water with between approximately 75% and approximately 80% saponifiable fat, heating said mixture to a temperature of approximately 190° F. while agitating the same, adding between approximately 9% to approximately 11% quicklime to said mixture while continuing the agitation, raising the temperature of the mass with continued agitation to approximately 230° F. whereat saponification commences to take place, removing the entire batch from the reaction vessel after the same has been substantially completely saponified, permitting the removed batch to cool and dry, and reducing the mass to a pulverulent state.

2. The process of making an additive for ready mechanical admixture with stock feeds which includes mixing between approximately 10% and approximately 12% water with between approximately 75% to approximately 80% saponifiable fat, heating said mixture to a temperature of approximately 190° F. while agitating the same, adding between approximately 9% to approximately 11% quicklime to said mixture while continuing the agitation, raising the temperature of the mass to approximately 230° F. whereat saponification commences to take place while successively increasing and decreasing the rate of agitation, thereby obtaining an accompanying rising and falling of the mass, removing the entire batch from the reaction vessel after the same has been substantially completely saponified, permitting the removed batch to cool and dry, and reducing the mass to a pulverulent state.

3. The process of making an additive for ready mechanical admixture with stock feeds which includes mixing approximately 11.75% water with approximately 77.75% saponifiable fat, heating said mixture to a temperature of approximately 190° F. while agitating the same, adding approximately 10.50% quicklime to said mixture while continuing the agitation, raising the temperature of the mass with continued agitation to approximately 230° F. whereat saponification commences to take place, removing the entire batch from the reaction vessel after the same has been substantially completely saponified, permitting the removed batch to cool and dry, and reducing the mass to a pulverulent state.

4. The process of making an additive for ready mechanical admixture with stock feeds which includes mixing approximately 11.75% water with approximately 77.75% saponifiable fat, heating said mixture to a temperature of approximately 190° F. while agitating the same, adding approximately 10.50% quicklime to said mixture while continuing the agitation, raising the temperature of the mass to approximately 230° F. whereat saponification commences to take place while successively increasing and decreasing the rate of agitation, thereby obtaining an accompanying rising and falling of the mass, removing the entire batch from the reaction vessel after the same has been substantially completely saponified, permitting the removed batch to cool and dry, and reducing the mass to a pulverulent state.

References Cited in the file of this patent

UNITED STATES PATENTS

| | | |
|---|---|---|
| 858,295 | Krebitz | June 25, 1907 |
| 898,547 | Barrett | Sept. 15, 1908 |
| 1,831,164 | Dawe | Nov. 10, 1931 |

OTHER REFERENCES

Thomssen: Soaps and Detergents, 1949, MacNair-Dorland Co., N.Y., pp. 69, 70, 269–273.